Sept. 26, 1933.  T. A. SIMPSON  1,928,115
SPARE WHEEL CARRIER
Filed Jan. 16, 1931
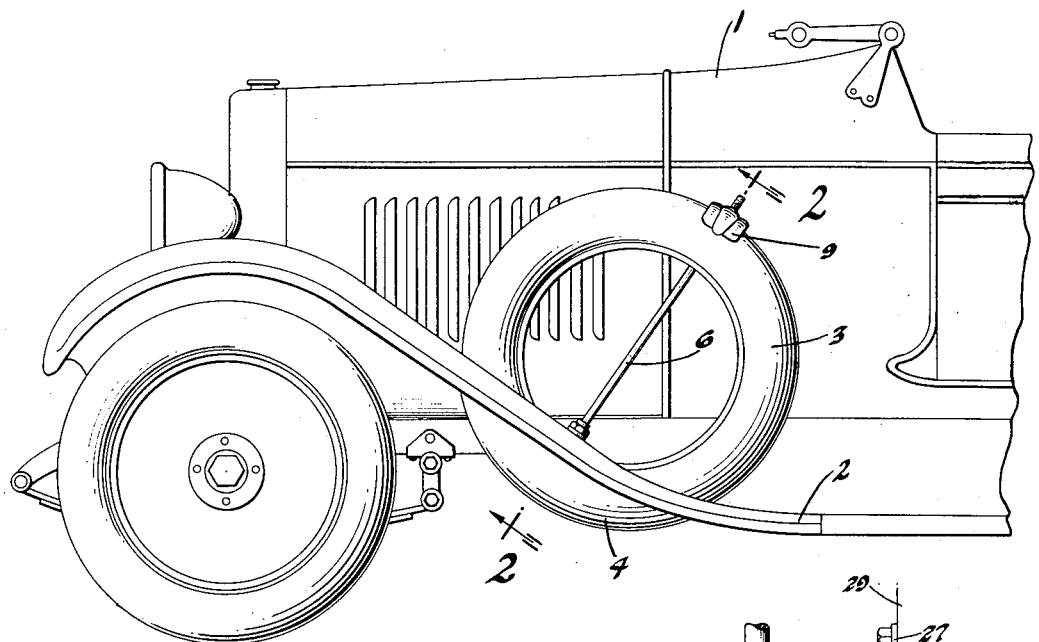
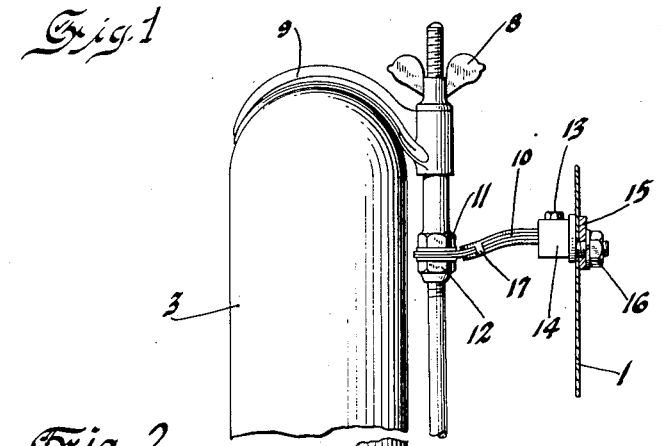
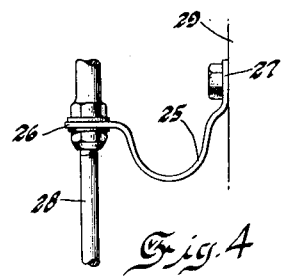
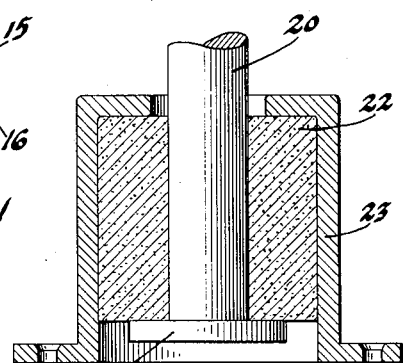
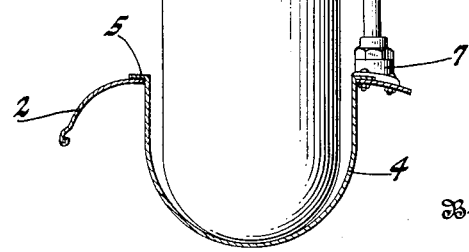
Inventor
Thomas A. Simpson Patented Sept. 26, 1933

1,928,115

UNITED STATES PATENT OFFICE 1,928,115

SPARE WHEEL CARRIER

Thomas Archibald Simpson, London, England, assignor to General Motors Corporation, Detroit, Mich., a corporation of Delaware Application January 16, 1931. Serial No. 509,089

7 Claims. (Cl. 224—29)

This invention relates to spare tire carriers for motor vehicles and particularly to an improvement in the fender well type of carrier.

A structure heretofore in general and approved use on a number of different makes of motor cars and concerning which this invention is intended to make better, involves a well or pocket formed in a portion of the fender or mud guard for the front wheel to receive a spare or extra tire, sometimes mounted on a quick detachable rim or an extra wheel, with a tire engaging member or clamp for a portion of the tire opposite that positioned in the well, removably carried on the upper end of a support or tie rod extending vertically or upwardly beside the vehicle body and being secured or anchored at its lower end to the fender, such upright being held against lateral movement by a rigid brace or distance member between the rod near its upper end and an adjacent part of the car body. This construction has considerable merit over other kinds of fender well carriers especially in that the tire clamp is securely positioned with relation to the fender by the upright or support when a tire is mounted in the well, and therefore, acts with the well as a unit to firmly hold the tire in place. It has been found, however, because of vibration of this unit, augmented by the resiliency of the pneumatic tire and relative movements between the fender supporting the weight of the tire and the body, both of which are independently mounted on the chassis frame, as sometimes occurs when the vehicle is traveling on rough roads or negotiating sharp turns and which has a tendency to increase with the length of time the car is in service, as a natural result of wear and looseness of parts, that considerable strains are placed on the bracing member which, because of its rigidness, resists the movements and tends to prevent fender sag but which, under continued stress, either suffers complete breakage or tears away from its points of attachment and becomes loose. In many cases the rigidity of the structure causes looseness and breakage of other parts, especially the vertical rod.

To eliminate troubles experienced with such design and improve its general structure with little or no increase in costs and still maintain its advantageous features, are among the primary purposes of the present invention. To this end there is contemplated the incorporation in the structure of a certain amount of flexibility, as distinguished from absolute rigidity and which, in addition to overcoming the difficulties of breakage heretofore referred to, avoids a great deal of rattle and noise present in the rigid design.

The invention will be better understood upon reference to the accompanying drawing, wherein Figure 1 is an elevation of the front portion of an automobile having the subject matter hereof applied thereto.

Figure 2 is a sectional view taken on line 2—2 of Figure 1 and

Figure 3 is a detail sectional view of an alternative arrangement, while Figure 4 is a fragmentary view of a modified type of brace.

Referring to the drawing, the reference character 1 indicates the cowl of an automobile body and 2 is the front fender or mud guard. The fender is shown as being provided with a well or pocket to receive the tire 3. This well may consist of an arcuate stamping 4 of substantially U-shape in transverse section which fits in an elongated opening in the fender 2 and has an outturned marginal flange 5 resting upon the upper surface of the fender and secured thereto as by means of welding. Extending upwardly on the inner side of the well and adjacent the body is a support or tie rod 6 having its lower end secured by means of a bracket 7 to the fender and having its free end screw threaded to adjustably receive the wing nut 8 which removably secures on the rod the tire engaging clamp 9, so positioned by the rod as to engage with the periphery of the tire at a point substantially diametrically opposite that within the well.

To brace the upper end of the upright rod particularly against lateral movement, there may be employed a tie or distance member 10 shown in the drawing as a laminated leaf spring consisting of four leaves extending between the cowl 1 and rod 6 in a plane substantially at right angles to the longitudinal axis of the upright or tie rod. The two innermost leaves are shown as being of greater length than the outermost leaves and as having beyond the ends of the outer leaves, openings through which the rod 6 extends, a pair of nuts 11 and 12 being threaded on the rod on opposite sides of the leaf spring to secure it to the rod. The opposite ends of the inner leaves, as well as the adjacent ends of the outer leaves, are secured as by means of a set screw 13 in a slot of an attachment bracket 14 which is provided with a screw stud for extension through the cowl panel and reinforcement strap 15 with a fastening nut 16 thereon. Adjacent the free ends of the outer leaves an encircling clip may be used to maintain the leaves in alinement or, as shown in the drawing, one of the leaves may have an ear 17 dependent from each side for contact with the edges of the other leaves.

Since the leaf springs are inextensible in the direction of their plane but are flexible at right angles thereto, it will be obvious that the distance member provided for the upper end of the tie rod will hold the rod against all ordinary lateral movement but will accommodate and cushion any movements in the direction of the longitudinal extent of the upright. It will be noted that the leaf spring has an intermediate portion thereof inclined so that the spring in side elevation is somewhat ogee in shape. This arrangement of the spring will allow it to have some beneficial effect in damping centrifugal forces incident to vehicle travel around sharp curves or turns at high speeds. Instead of employing a laminated leaf spring the distance member might easily be constituted by a single leaf, as will be obvious.

If desired the alternative structure shown in Figure 3 may be used either by itself or in combination with the flexible connection between the upper end of the tie rod and the body, to cushion strains heretofore mentioned. In this figure the tie rod, indicated by the numeral 20, has an enlarged terminal head 21 and is surrounded at its lower end just above the head 21 by a sleeve or bushing 22 of rubber, or other elastic material, which in turn is enclosed within a cup-shaped bracket 23 for attachment to the fender. The bushing 22 may be bonded or united to the adjacent surfaces of the rod 20 and casing 23 as by vulcanization and its inherent elasticity depended upon for the cushioning action.

In lieu of the flexible brace shown in Figure 2, it may be found desirable in some cases to use the structure illustrated in Figure 4 wherein there is disclosed a substantially U-shaped cushioning element 25 consisting of either a single or a multiple leaf spring provided with an intermediate bend or open loop and outturned end portions 26 and 27 secured respectively to the upright carrier bar 28 and body panel or support 29. This alternative construction is intended to accommodate both vertical and lateral movements for eliminating the imposition of damaging strains.

Although the above description has been more or less specific it will be understood that the invention is capable of such various modifications as come within the scope of the appended claims.

I claim:

1. In a motor vehicle, a fender well to receive a spare tire, a rod extending upwardly from the fender beside the vehicle body, a non-metallic cushioning connection between the fender and the lower end of said rod and means associated with the upper end of the rod to retain a tire in the well.

2. In a motor vehicle, a fender well to receive a spare tire, a rod extending upwardly from the fender beside the vehicle body, a cushion joint, yieldable longitudinally of the rod for connecting the lower end of the rod and the fender, and a tire retaining element at the outer end of the rod to hold a tire in the well.

3. In a motor vehicle, a fender well to receive a spare tire, a rod extending upwardly from the fender beside the vehicle body, a non-metallic connection between the rod and fender accommodating longitudinal movement of the rod, a resilient member for bracing the outer end of the rod from the body and means on the rod independent of said member for exerting downward pressure on a tire within the well.

4. In a motor vehicle, a fender well to receive a spare tire, a rod extending upwardly therefrom beside the body, a tire retainer movably carried on the rod, pressure exerting means to move said retainer toward the well, and a flexible member tying the upper end of the rod to the body.

5. In a motor vehicle, a fender well to receive a spare tire assembly, a rod extending upwardly from the fender beside the vehicle body, a brace connected at opposite ends to the rod and vehicle body respectively and flexible intermediate its ends, a retainer mounted directly and solely upon said rod for movement toward and from the well, and adjustable means to exert clamping pressure on said retainer toward the well whereby to clamp a tire assembly between the well and retainer.

6. In a motor vehicle, a tire receiving well, retainer means adapted to hold with a downward force a tire positioned in the well, and resilient means between the retainer and the well yieldable to accommodate relative up and down movement of the retainer and the well when the parts are in adjusted tire carrying position.

7. In a motor vehicle having a body and a fender provided with a tire receiving well, a tensionable rod extending upwardly from the fender beside the body and adapted to carry an adjustable member for clamping a tire in the well, and a flexible member connected at opposite ends to the upper end of the rod and the body for bracing the rod while accommodating its movement as a unit with the fender relative to the body.

THOMAS ARCHIBALD SIMPSON.